United States Patent
Wilke et al.

(10) Patent No.: US 12,091,108 B2
(45) Date of Patent: Sep. 17, 2024

(54) METHODS AND SYSTEMS FOR A PITCH ANGLE RECOGNITION OF A STEERING COLUMN IN A VEHICLE

(71) Applicant: Aptiv Technologies AG, Schaffhausen (CH)

(72) Inventors: Detlef Wilke, Sibbesse (DE); Soeren Smits, Neustadt (DE); Alexander Hecht, Hannover (DE); Pavlo Kleymonov, Hildesheim (DE)

(73) Assignee: Aptiv Technologies AG, Schaffhausen (CH)

( * ) Notice: Subject to any disclaimer, the term of this patent is extended or adjusted under 35 U.S.C. 154(b) by 239 days.

(21) Appl. No.: 17/812,891

(22) Filed: Jul. 15, 2022

(65) Prior Publication Data
US 2023/0018008 A1    Jan. 19, 2023

(30) Foreign Application Priority Data
Jul. 16, 2021 (EP) .................... 21185989

(51) Int. Cl.
B62D 5/04    (2006.01)
(52) U.S. Cl.
CPC ........... *B62D 5/049* (2013.01); *B62D 5/0496* (2013.01)
(58) Field of Classification Search
CPC ... B62D 5/049; B62D 5/0496; B62D 15/0215
See application file for complete search history.

(56) References Cited

U.S. PATENT DOCUMENTS

| 5,212,640 A | 5/1993 | Matsuda |
| 8,098,887 B2 | 1/2012 | Inada |
| 2008/0009994 A1 | 1/2008 | Kato et al. |
| 2010/0145579 A1* | 6/2010 | O'Brien ............... B62D 5/0457 |
| | | 701/42 |
| 2010/0292903 A1 | 11/2010 | Stoehr et al. |

(Continued)

FOREIGN PATENT DOCUMENTS

| EP | 3786764 | 3/2021 |
| JP | 2009113621 | 5/2009 |

(Continued)

OTHER PUBLICATIONS

"Extended European Search Report", EP Application No. 21185989.7, Dec. 7, 2021, 7 pages.

*Primary Examiner* — George C Jin
(74) *Attorney, Agent, or Firm* — Harness, Dickey & Pierce, P.L.C.

(57) ABSTRACT

The present disclosure discloses a computer-implemented method for a pitch angle recognition of a steering column in a vehicle. In aspects, the computer-implemented method includes measuring first acceleration data using a first acceleration sensor and measuring second acceleration data using a second acceleration sensor. The computer-implemented method further includes determining drift data of at least one of the first acceleration sensor and the second acceleration sensor based on the first acceleration data and the second acceleration data. Additionally, the computer-implemented method includes determining a pitch angle of the steering column based on the drift data, the first acceleration data, and the second acceleration data.

20 Claims, 4 Drawing Sheets

(56) References Cited

U.S. PATENT DOCUMENTS

| | | | |
|---|---|---|---|
| 2017/0232997 A1* | 8/2017 | Tsubaki | B62D 6/002 |
| | | | 180/443 |
| 2020/0173776 A1 | 6/2020 | Hayes et al. | |
| 2021/0347411 A1* | 11/2021 | Roat | B62D 15/0205 |
| 2022/0136918 A1* | 5/2022 | Frachon | G01L 3/104 |
| | | | 73/862.325 |
| 2022/0193278 A1* | 6/2022 | Lee | A61L 2/24 |
| 2022/0289276 A1* | 9/2022 | Nichols | B62D 1/183 |

FOREIGN PATENT DOCUMENTS

| | | |
|---|---|---|
| JP | 2010100142 | 5/2010 |
| KR | 101601294 | 3/2016 |
| WO | 2014188704 | 11/2014 |

* cited by examiner

METHODS AND SYSTEMS FOR A PITCH ANGLE RECOGNITION OF A STEERING COLUMN IN A VEHICLE

INCORPORATION BY REFERENCE

This application claims priority to European Patent Application Number EP21185989.7, filed Jul. 16, 2021, the disclosure of which is incorporated by reference in its entirety.

BACKGROUND

Pitch angle recognition of a steering column in a vehicle become more and more important if driving assistance systems make use of a camera that is mounted on the steering column to observe driver's behavior. Especially autonomous or semi-autonomous driving assistance systems may use information captured by the camera such as the driver's eyes and head pose to derive information about the awareness or the viewing direction of the driver. Therefore, the location of the camera needs to be known in order to receive reliable information. EP 3 786 764 A1 describes a method and a device for localizing an image sensor, e.g., a camera, mounted on a vehicle based on at least one detected change in the passenger's viewing direction to at least one detected object outside the vehicle. Since the camera is mounted on the steering column of the vehicle, the pitch angle, i.e., the inclination of the steering column with respect to a ground plate of the vehicle, of the steering column affects the line of sight of the camera. A knowledge of the pitch angle of the steering column allows to calibrate the camera to capture the driver's behavior.

Accordingly, there is a need to reliably recognize the pitch angle of the steering column.

SUMMARY

The present disclosure provides a computer-implemented method, a computer system and a non-transitory computer readable medium according to the independent claims. Embodiments are given in the subclaims, the description and the drawings.

In one aspect, the present disclosure may be directed to a computer-implemented method for a pitch angle recognition of a steering column in a vehicle, wherein the method comprises the following steps carried out by computer hardware components: measuring first acceleration data by means of a first acceleration sensor; measuring second acceleration data by means of a second acceleration sensor; determining drift data of at least one of the first acceleration sensor and the second acceleration sensor based on the first acceleration data and the second acceleration data; and determining a pitch angle of the steering column based on the drift data, the first acceleration data and the second acceleration data.

Based on the measurement data of the first acceleration sensor and the second acceleration sensor the pitch angle of a steering column in a vehicle may be recognized. The first acceleration sensor may be mounted on the steering column of the vehicle and the second acceleration sensor may be mounted at a vehicle location different from the steering column. Drift data of at least one of the first acceleration sensor and the second acceleration sensor as well as the measurement data of the first acceleration sensor and the second acceleration sensor may be considered in the pitch angle determination of the steering column.

A steering column forms part of the steering system of vehicles such as cars, trucks, or the like. The steering column may be connected at the top to the steering wheel and may transmit the movements of the steering wheel to a steering linkage of the vehicle wheels, to steer the vehicle. The steering column may be located in front of the driver's seat in the direction of travel and may run from the position of the steering wheel down to the steering linkage.

The pitch angle of the steering column defines an angle between the orientation of the steering column, i.e., the steering column axis in longitudinal direction of the steering column, and a ground plane of the vehicle, i.e., the direction of a vehicle axis in longitudinal direction of the vehicle.

The first acceleration sensor and the second acceleration sensor may be devices that acceleration of a structure. The acceleration may be measured in a sensor-coordinate system. The sensor-coordinate system may be dependent on the location of the sensor. In one embodiment, the first acceleration sensor and the second acceleration sensor may be mechanical accelerometers, capacitive accelerometers or piezoelectric accelerometers and may measure the acceleration of an object in three dimensions, i.e., the first accelerometer and the second accelerometer may be three-dimensional (3D)-accelerometers. By measuring the amount of acceleration due to gravity, the orientation of the accelerometer may be determined in three dimensions. It may also be possible to measure the acceleration of an object by means of two two-dimensional (2D)-accelerometers, i.e., the first acceleration sensor may comprise two 2D-accelerometers which measure the acceleration at least in three dimensions. The same may apply to the second acceleration sensor. In another embodiment gyroscope sensors may be used to measure the acceleration of an object or a combination of acceleration sensors and gyroscope sensors may be used. It may also be possible to use gyroscope sensors in addition to acceleration sensors. The gyroscope sensors may be 3D-gyroscope sensors.

The drift data may origin from a deviation of measurement data compared to calculated data or a deviation of measurement data captured at different points in time. For instance, a deviation between a measurement at point in time t=1 and a measurement at point in time t=10. The drift data may reflect environmental influences on the at least one of the first acceleration sensor or the second acceleration sensor, for example a temperature drift, and/or deviations caused by production of at least one of the first acceleration sensor or the second acceleration sensor or a lifetime drift.

According to an embodiment, the method further comprises the following step carried out by the computer hardware components: compensating a temperature drift of at least one of the first acceleration sensor and the second acceleration sensor based on the drift data.

A temperature drift may be caused due to different temperatures between the first acceleration sensor and the second acceleration sensor. Also, a temperature drift regarding to two different points in time or during a period of time of measurements may be possible. For example, a temperature drift may occur between a measurement at point in time t=1 and temperature T1 and a measurement at point in time t=100 and temperature T100. The period of time may be 1 second (s), 10 s, 1 minute (min), or up to 5 min. In one embodiment, the period of time may be 100 s. A temperature drift may also be possible regarding to two different determinations or after a number of determinations. The number of determinations may be 100, 500, 1000, or up to 10000. In one embodiment, the number of determinations may be 5000.

According to an embodiment, the method further comprises the following step carried out by the computer hardware components: compensating a lifetime drift of at least one of the first acceleration sensor and the second acceleration sensor based on the drift data.

A lifetime drift may occur due to deviations caused by production or deterioration of the first acceleration sensor and/or the second acceleration sensor. Also, a lifetime drift between two acceleration sensors regarding to two different points in time or during a period of time of measurements may be possible. For example, a lifetime drift may occur between a measurement at point in time t=1 as an initial measurement and a measurement at point in time t=100. The difference of the measurement data at t=1 and the measurement data at t=100 may be a lifetime drift. The period of time may be 1 s, 10 s, 1 min, or up to 5 min. In one embodiment, the period of time may be 100 s. A temperature drift may also be possible regarding to two different determinations or after a number of determinations. The number of determinations may be 100, 500, 1000, or up to 10000. In one embodiment, the number of determinations may be 5000.

According to an embodiment, the method further comprises the following steps carried out by the computer hardware components: determining a plurality of first roll angles at consecutive discrete points in time in a vehicle-coordinate system based on the first acceleration data; determining a plurality of first pitch angles at consecutive discrete points in time in a vehicle-coordinate system based on the first acceleration data; determining a plurality of second roll angles at consecutive discrete points in time in a vehicle-coordinate system based on the second acceleration data; determining a plurality of second pitch angles at consecutive discrete points in time in a vehicle-coordinate system based on the second acceleration data; determining a roll angle difference based on the plurality of first roll angles and the plurality of second roll angles; and determining a pitch angle difference based on the plurality of first pitch angles and the plurality of second pitch angles.

A roll angle may describe an angular displacement about the roll axis of the vehicle. Motion about this axis may be called roll. A pitch angle may describe an angular displacement about the pitch axis which is perpendicular to the roll axis and parallel to a ground plate of the vehicle. Motion about this axis may be called pitch. A discrete point in time may be $1/100$ s, $1/10$ s, 1 s, 10 s, 1 min, 10 min, 1 hour (h), 12 h, 1 day, 1 month, or 1 year. The plurality of first roll angles, first pitch angles, second roll angles and second pitch angles may be determined at consecutive discrete points in time, i.e., the points in time may follow one after another continuously.

According to an embodiment, the compensation of the temperature drift between the first acceleration sensor and the second acceleration sensor may be carried out after a predetermined number of determinations of the roll angle difference and/or the pitch angle difference, wherein the predetermined number of determinations may be between 1 and 100, for example 1, 2, 5, 10, 50, or 100.

The number of determinations may coincide with the number of consecutive discrete points in time, for example five determinations may be derived at five consecutive points in time.

According to an embodiment, the compensation of the lifetime drift between the first acceleration sensor and the second acceleration sensor may be carried out after a further predetermined number of determinations of the roll angle difference and/or the pitch angle difference, wherein the further predetermined number of determinations may be between 500 and 5000, for example 1000, 2000, 3000, or 5000.

According to an embodiment, the method further comprises the following step carried out by the computer hardware components: detecting a change in the pitch angle of the steering column based on the determined pitch angle and a pitch angle threshold.

The change in the pitch angle of the steering column may be caused by a manual or an electrical adjustment of the steering column by the driver of the vehicle. The pitch angle threshold may define a boundary to detect a change in the pitch angle caused by the driver.

According to an embodiment, the determination of the pitch angle of the steering column may be interrupted as long as the change in the pitch angle is detected.

In other words, there may be no pitch angle determination by the method described herein as long as a change in the pitch angle is detected. The pitch angle determination may start again, if the pitch angle is below the pitch angle threshold.

According to an embodiment, the method further comprises the following step carried out by the computer hardware components: resetting the drift data after the change in the pitch angle is detected.

The drift data for the temperature drift and/or the lifetime drift may be set to zero after a change in the pitch angle has been detected. The point in time may start with t=1 and the number of determinations may start with i=1 after a change in the pitch angle has been detected.

According to an embodiment, at least one of the first acceleration data and the second acceleration data may be transformed to a vehicle-coordinate system.

The vehicle-coordinate system may be a three-dimensional Cartesian coordinate system that is permanently located at the vehicle. The vehicle-coordinate system may describe a coordinate system wherein the vehicle's positive y- or pitch or lateral axis may always point to its left, and the positive z- or yaw or vertical axis may always point up from the ground to the air. The positive x- or roll or longitudinal axis may be perpendicular to the y-/z-plane and point to the driving direction of the vehicle. The origin of the vehicle-coordinate system may be fixed at the center of gravity of the vehicle but is not limited to that location. The origin of the vehicle-coordinate system may alternatively be somewhere else fixed at the vehicle.

According to an embodiment, the first acceleration data may be transformed to a camera-coordinate system, wherein the camera-coordinate system may origin in a camera mounted on the steering column of the vehicle.

The camera-coordinate system may be a three-dimensional Cartesian coordinate system that is permanently connected to the camera. The camera-coordinate system may be different to the vehicle-coordinate system.

According to an embodiment, the first acceleration data described in camera-coordinate system may be transformed to a vehicle-coordinate system.

In another aspect, the present disclosure is directed at a computer system, said computer system being configured to carry out several or all steps of the computer-implemented method described herein.

The computer system may comprise a plurality of computer hardware components (for example a processor, for example processing unit or processing network, at least one memory, for example memory unit or memory network, and at least one non-transitory data storage). It will be understood that further computer hardware components may be provided and used for carrying out steps of the computer-implemented method in the computer system. The non-transitory data storage and/or the memory unit may comprise a computer program for instructing the computer to perform several or all steps or aspects of the computer-implemented method described herein, for example using the processing unit and the at least one memory unit.

In another aspect, the present disclosure may be directed to a vehicle, comprising the computer system described herein, a first acceleration sensor and a second acceleration sensor.

The vehicle may be a car or a truck and the first acceleration sensor and the second acceleration sensor may be mounted on the vehicle. Acceleration data from at least one of the first acceleration sensor and the second acceleration sensor may be measured when the vehicle is moving or during standstill of the vehicle.

In another aspect, the present disclosure is directed at a non-transitory computer readable medium comprising instructions for carrying out several or all steps or aspects of the computer-implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer-implemented method described herein.

BRIEF DESCRIPTION OF THE DRAWINGS

Example embodiments and functions of the present disclosure are described herein in conjunction with the following drawings, showing schematically.

DETAILED DESCRIPTION

Figure 1A:
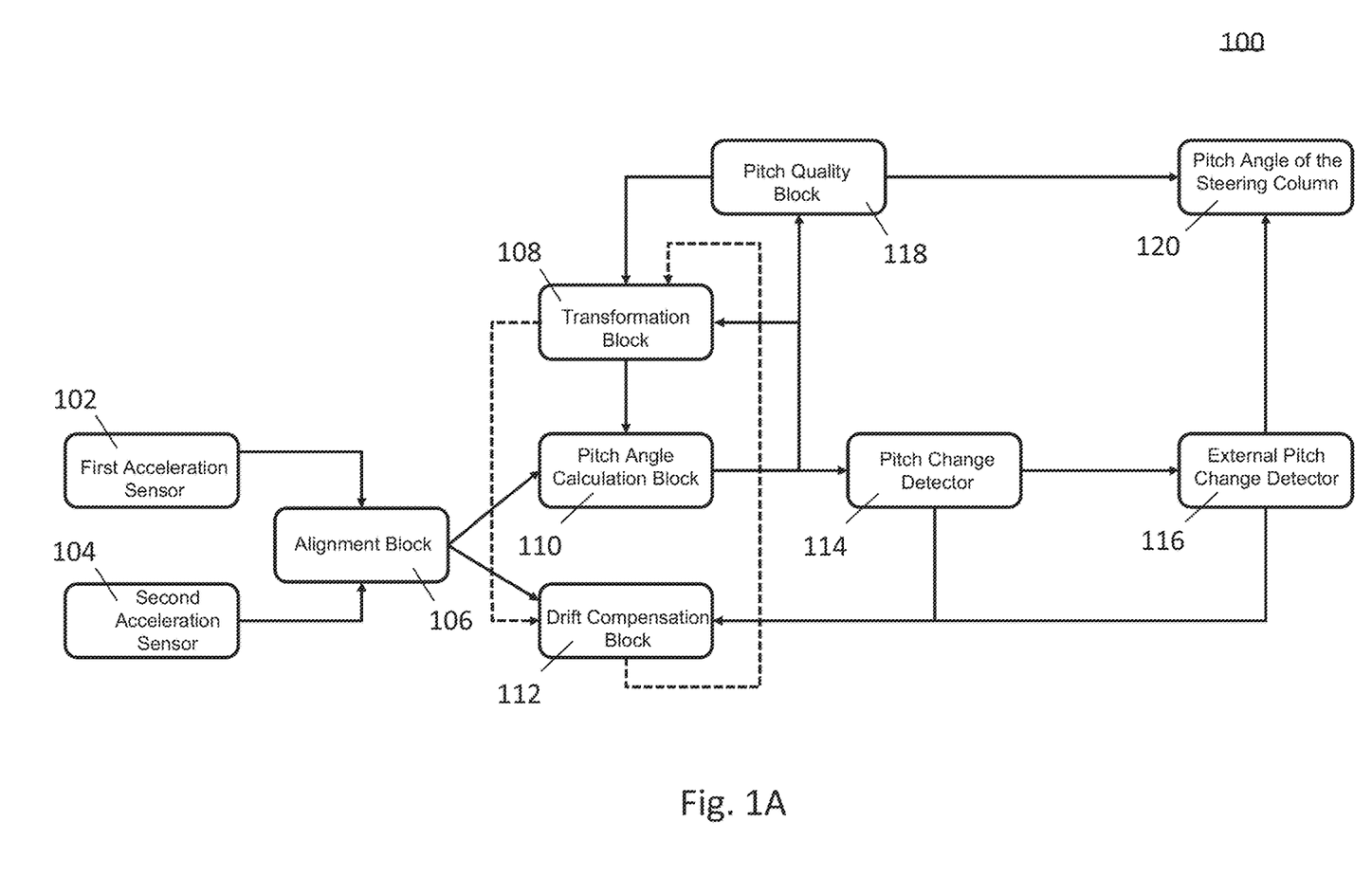
FIG. 1A a block diagram illustrating a method for a pitch angle recognition of a steering column in a vehicle.

FIG. 1A depicts a block diagram 100 illustrating a method for a pitch angle recognition of a steering column in a vehicle. A first acceleration sensor 102 may be mounted on the steering column of the vehicle. The first acceleration sensor 102 may measure first acceleration data. A second acceleration sensor 104 may be mounted at a vehicle location different from the steering column. The second acceleration sensor 104 may measure second acceleration data. The first acceleration sensor 102 and the second acceleration sensor 104 may measure a plurality of acceleration data (for example: samples) at a plurality of discrete points in time.

The first acceleration sensor 102 and the second acceleration sensor 104 may be located in the car cabin.

The output of the first acceleration sensor 102, i.e., measurement data or acceleration data of the first acceleration sensor 102, and the output of the second acceleration sensor 104, i.e., measurement data or acceleration data of the second acceleration sensor 104, may be an input of an alignment block 106. The alignment block 106 may align the output of the first acceleration sensor 102 and the output of the second acceleration sensor 104 to the same discrete point in time. In other words, the alignment block 106, may provide one of the plurality of acceleration data of the first acceleration sensor 102 and one of the plurality of acceleration data of the second acceleration sensor 104 at the same discrete point in time.

The output of the alignment block 106 may be input to a pitch angle calculation block 110 and a drift compensation block 112. The output of the drift compensation block 112 may be an input to a transformation block 108. Also, the output of the pitch angle calculation block 110 may be an input to the transformation block 108. The transformation block 108 may generate an output that also may be an input to the pitch angle calculation block 114 and the drift compensation block 112, as shown in FIG. 1A.

Starting at a discrete point in time t=1, the alignment block 106 may provide one first acceleration data of the first acceleration sensor 102 and one second acceleration data of the second acceleration sensor 104 at the discrete point in time t=1. The initial pitch angle may be unknown and the output of the drift compensation block 112, e.g., a drift compensation matrix, may be a unity matrix, i.e., there may be no drift compensation at the beginning point in time t=1. Thus, at t=1 the first acceleration data of the first acceleration sensor 102 may be transformed from a sensor-coordinate system of the first acceleration sensor 102 into a camera-coordinate system of a camera which may be mounted on the steering column of the vehicle. In a next step, the acceleration data described in camera-coordinate system (for example: the camera acceleration data) may be transformed into a vehicle-coordinate system, wherein the pitch angle may be set to zero, i.e., there may only be a transformation of the roll angle and yaw angle from the first acceleration data in camera-coordinate system into first acceleration data in vehicle-coordinate system. The second acceleration data of the second acceleration sensor 104 may be transformed from a sensor-coordinate system of the second acceleration sensor 104 into the vehicle-coordinate system which may be fixed to the vehicle. The outcome of this transformations is that both the first acceleration data of the first acceleration sensor 102 and the second acceleration data of the second acceleration sensor 104 are represented in the vehicle-coordinate system. Since there is no drift compensation at the beginning, the drift matrix for the first acceleration sensor 102 and the drift matrix for the second acceleration sensor 104 which may be defined by the drift data of the first acceleration sensor 102 and the drift data of the second acceleration sensor 104 are unity matrices. The drift matrices of the first acceleration sensor 102 and the drift matrix of the second acceleration sensor 104 may be stored and updated in each discrete point in time in the transformation block 108. The output of the transformation block 108 at point in time t=1 at the beginning is therefore the first acceleration data of the first acceleration sensor 102 described in vehicle-coordinate system and the second acceleration data of the second acceleration sensor 104 described in vehicle-coordinate system.

Figure 1B:
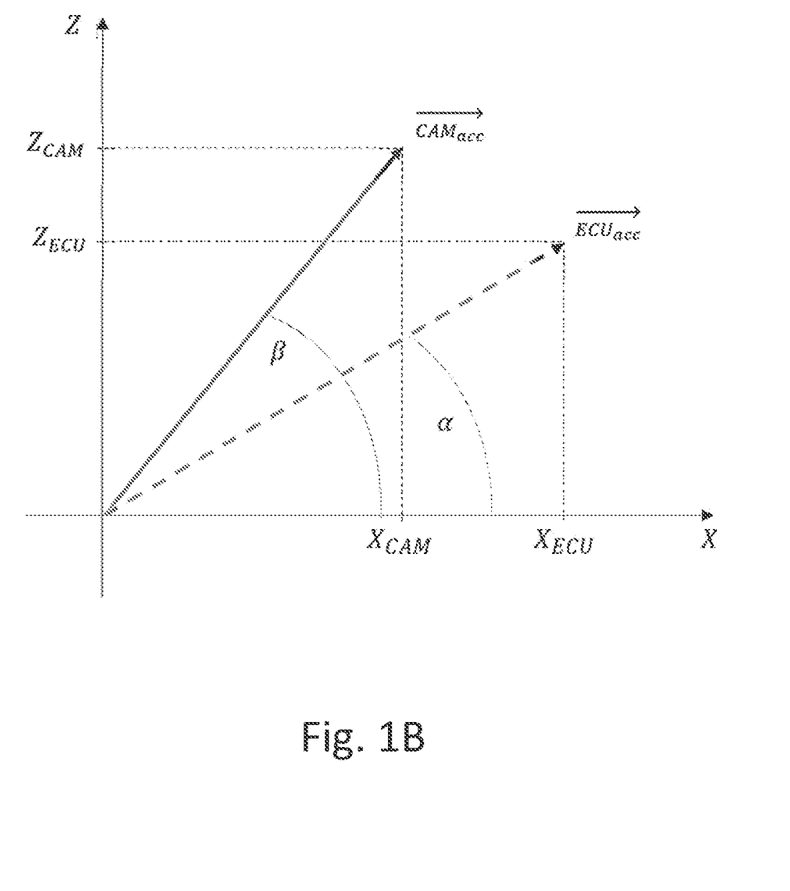
FIG. 1B a graphical presentation of a pitch angle calculation in a vehicle-coordinate system.

In the pitch angle calculation block 110 the output of the transformation block 108 and the output of the alignment block 106 may be used to calculate the pitch angle of the steering column. Also, several filters like low-pass filter, limits-filter and/or moving average filter may be applied to the first acceleration data and the second acceleration data to estimate the pitch angle of the steering column. FIG. 1B shows a graphical presentation of a pitch angle calculation in a vehicle-coordinate system. After a transformation of the first acceleration sensor and the second acceleration sensor to the vehicle-coordinate system, the first acceleration sensor and the second acceleration sensor may provide a first acceleration vector ($\overrightarrow{CAM_{acc}}$) and a second acceleration vector ($\overrightarrow{ECU_{acc}}$) in a same X/Z surface, as shown in FIG. 1B. The differences between a first angle ($\beta$) and a second angle ($\alpha$) may be the pitch angle of the steering column in the vehicle-coordinate system. The pitch angle of the steering column may be calculated by the formula:

$$\text{pitch\_angle} = \beta - \alpha$$

$$\alpha = \operatorname{atan}\left(\frac{Z_{ECU}}{X_{ECU}}\right)$$

$$\beta = \operatorname{atan}\left(\frac{Z_{CAM}}{X_{CAM}}\right)$$

wherein $Z_{CAM}$ is the ordinate of the first acceleration vector ($\overrightarrow{CAM_{acc}}$), $X_{CAM}$ is the abscissa of the first acceleration vector ($\overrightarrow{CAM_{acc}}$), $Z_{ECU}$ is the ordinate of the second acceleration vector ($\overrightarrow{ECU_{acc}}$) and $X_{ECU}$ is the abscissa of the second acceleration vector ($\overrightarrow{ECU_{acc}}$) in the vehicle-coordinate system.

As soon as a first pitch angle of the steering column has been calculated, also drift data of the first acceleration sensor 102 and the second acceleration sensor 104 may be calculated in the drift compensation block 112 for drift compensation. Drift data compensation may be necessary, since there may be a temperature drift and a lifetime drift of the first acceleration sensor 102 and the second acceleration sensor 104. The temperature drift of the first accelerations sensor 102 and the second acceleration sensor 104 may have the same direction or may have a different direction. The first acceleration sensor 102 and the second acceleration sensor 104 may be calibrated at 20° C., i.e., there may be no temperature drift between the first acceleration sensor 102 and the second acceleration sensor 104 at 20° C. To calculate the drift data, a predetermined number of determinations N of the roll angle and/or the pitch angle of the first acceleration sensor 102 and the second acceleration sensor 104 may be carried out by the following formulas:

$$Roll_{estimated\_delta} = \operatorname{atan}\left(\frac{\sum_{i=1}^{N}(Y_i)}{\sum_{i=1}^{N}(Z_i)}\right)$$

$$Pitch_{estimated\_delta} = -\operatorname{atan}\left(\frac{\sum_{i=1}^{N}(X_i)}{\sqrt{\left(\sum_{i=1}^{N}(Y_i)\right)^2 + \left(\sum_{i=1}^{N}(Z_i)\right)^2}}\right)$$

wherein i=1, ..., N and $X_i$, $Y_i$, $Z_i$ may be the coordinates of the first acceleration sensor 102 or the second acceleration sensor 104 described in the vehicle-coordinate system, respectively. The drift compensation between the first acceleration sensor 102 and the second acceleration sensor 104 may be calculated based on the difference of the drift data of the first acceleration sensor 102 and the second acceleration sensor 104 for the roll angle and/or the pitch angle.

The temperature drift between the first acceleration sensor 102 and the second acceleration sensor 104 may be carried out after a predetermined number of determinations N of the roll angle difference and/or the pitch angle difference, wherein the predetermined number of determinations N may be for example 1, 2, 5, 10, 50, or 100. After a predetermined number of determinations N, a roll angle difference and/or a pitch angle difference between the first acceleration sensor 102 and the second acceleration sensor 104 may be determined in such a way that the difference of the roll angle and/or the pitch angle at the predetermined number of determinations N and the roll angle and/or the pitch angle at the beginning (i.e., t=1) may be calculated.

A corresponding drift compensation calculation may be determined for the lifetime drift. The difference between the calculation of the temperature drift and the lifetime drift may be only in the predetermined number of determinations N, i.e., for the lifetime drift calculation a further predetermined number of determinations M may be defined, wherein the further predetermined number of determinations M for the lifetime drift may be much higher (e.g., 1000, 2000, 3000, or 5000) than the predetermined number of determinations N for the temperature drift (e.g., 1, 2, 5, 10, 50, or 100). In other words, the lifetime drift may be calculated less often than the temperature drift.

Once a drift compensation has been calculated in the drift compensation block 112, the drift compensation may be considered in the transformation block 108. Applying the drift compensation to the first acceleration data of the first acceleration sensor 102 and to the second acceleration data of the second acceleration sensor 104 may compensate the change of the pitch angle of the steering column caused by the temperature drift and/or the lifetime drift.

After the pitch angle calculation in the pitch angle calculation block 110 has been carried out, the pitch angle is no longer unknown, i.e., the pitch angle may also be considered in the transformation block 108. Additionally, a quality of the calculated pitch angle may be estimated in a pitch quality block 118. The quality of the pitch angle may be determined by standard deviation method or the like. In one embodiment, a sliding window approach for 1000 samples may be used for calculating the standard deviation. The quality of the calculated pitch angle may be based on a threshold, i.e., if the standard deviation is smaller than the threshold, the quality of the calculated pitch angle is good. A calculation of the pitch angle may only be performed if the quality of the pitch angle is above a predetermined pitch quality threshold.

To distinguish between changes in the pitch angle caused by temperature drift and/or lifetime drift on the one hand and a (mechanical or electrical) adjustment of the steering column position by the driver pm the other hand, a change in the pitch angle detector 114 may be used. The pitch angle change detector 114 may detect an adjustment performed by the driver if the calculated pitch angle based on the first acceleration data, the second acceleration data and the drift data is above a pitch angle threshold. The pitch angle threshold may define a boundary above pitch angle variations caused by vibrations or the like to detect a change in the pitch angle caused by the driver reliable.

According to another embodiment, an external pitch angle change detector 116 may be used to detect an adjustment of the steering column position performed by the driver. There may be signals on the CAN-bus of the vehicle for example, if the driver adjusts the steering column electrically.

As soon as a (mechanical or electrical) adjustment of the steering column position by the driver has been detected, the drift data calculation may be interrupted and a reset of the drift data may be executed. As long as the change in the pitch angle is detected, there is no pitch angle calculation performed by the pitch calculation block 110. The predetermined number of determinations N and the further predetermined number of determinations M for the drift data calculation of a temperature drift and a lifetime drift may be set to 1. The drift data calculation may restart again as soon as a new pitch angle has been calculated by the pitch calculation block 110 and the pitch quality is above a predetermined pitch quality threshold.

Figure 2:
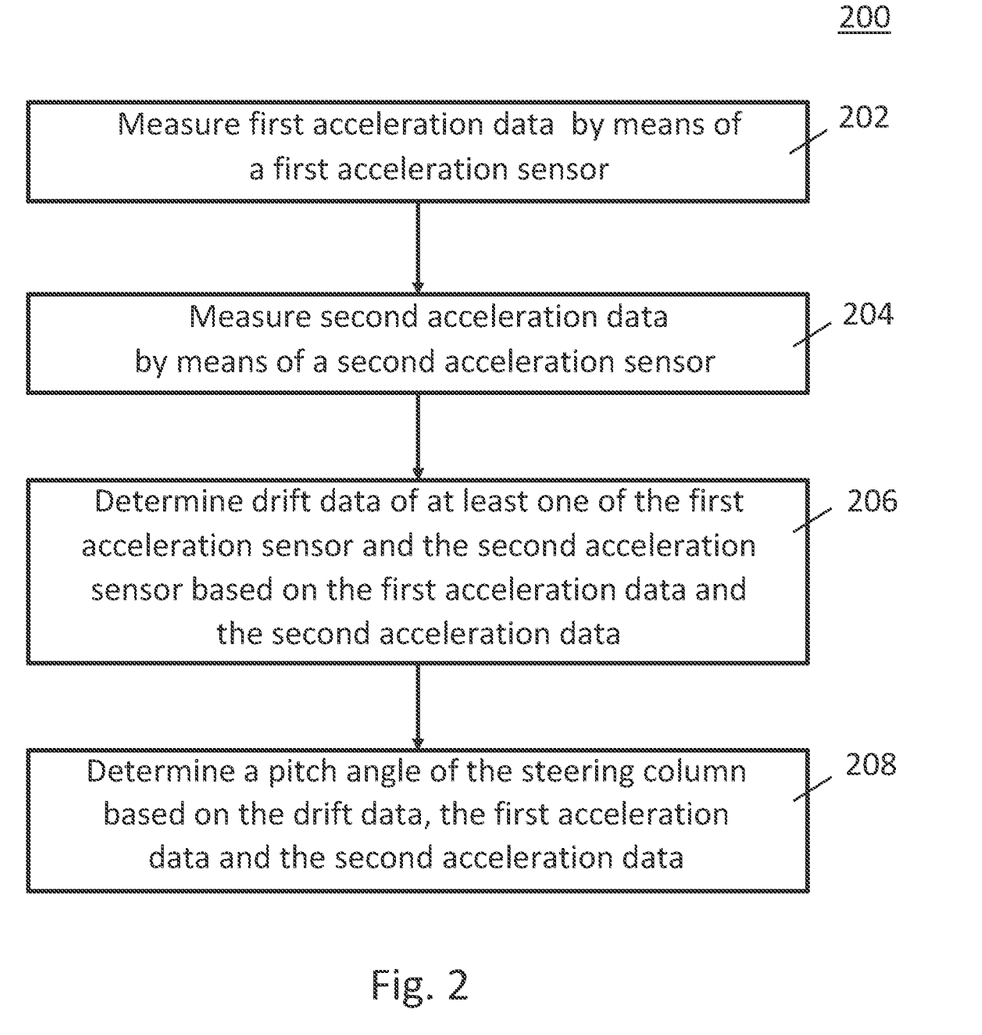
FIG. 2 a flow diagram illustrating a method for a pitch angle recognition of a steering column in a vehicle according to various embodiments.

FIG. 2 shows a flow diagram 200 illustrating a method for a pitch angle recognition of a steering column in a vehicle according to an embodiment. At 202, first acceleration data may be measured by means of a first acceleration sensor 102. At 204, second acceleration data may be measured by means of a second acceleration sensor 104. At 206, drift data of at least one of the first acceleration sensor 102 and the second acceleration sensor 104 may be determined based on the first acceleration data and the second acceleration data. At 208, a pitch angle of the steering column may be determined based on the drift data, the first acceleration data and the second acceleration data.

Each of the steps 202, 204, 206, 208, and the further steps described above may be performed by computer hardware components, for example as described with reference to FIG. 3.

According to an embodiment, the method may further include: compensating a temperature drift of at least one of the first acceleration sensor 102 and the second acceleration sensor 104 based on the drift data.

According to an embodiment, the method may further include: compensating a lifetime drift of at least one of the first acceleration sensor 102 and the second acceleration sensor 104 based on the drift data.

According to an embodiment, the method may further include: determining a plurality of first roll angles at consecutive discrete points in time in a vehicle-coordinate system based on the first acceleration data; determining a plurality of first pitch angles at consecutive discrete points in time in a vehicle-coordinate system based on the first acceleration data; determining a plurality of second roll angles at consecutive discrete points in time in a vehicle-coordinate system based on the second acceleration data; determining a plurality of second pitch angles at consecutive discrete points in time in a vehicle-coordinate system based on the second acceleration data; determining a roll angle difference based on the plurality of first roll angles and the plurality of second roll angles; and determining a pitch angle difference based on the plurality of first pitch angles and the plurality of second pitch angles.

According to an embodiment, the compensation of the temperature drift between the first acceleration sensor 102 and the second acceleration sensor 104 may be carried out after a predetermined number of determinations N of the roll angle difference and/or the pitch angle difference, wherein the predetermined number of determinations N may be between 1 and 100, for example 1, 2, 5, 10, 50, or 100.

According to an embodiment, the compensation of the lifetime drift between the first acceleration sensor 102 and the second acceleration sensor 104 may be carried out after a further predetermined number of determinations M of the roll angle difference and/or the pitch angle difference, wherein the further predetermined number of determinations M may be between 500 and 1000, for example 1000, 2000, 3000, or 5000.

According to an embodiment, the method may further include: detecting a change in the pitch angle of the steering column based on the determined pitch angle and a pitch angle threshold.

According to an embodiment, the determination of the pitch angle of the steering column may be interrupted as long as the change in the pitch angle is detected.

According to an embodiment, the method may further include: resetting the drift data after the change in the pitch angle is detected.

According to an embodiment, at least one of the first acceleration data and the second acceleration data may be transformed to a vehicle-coordinate system.

According to an embodiment, the first acceleration data may be transformed to a camera-coordinate system, wherein the camera-coordinate system may origin in a camera mounted on the steering column of the vehicle.

According to an embodiment, the first acceleration data described in camera-coordinate system may be transformed to a vehicle-coordinate system.

Figure 3:
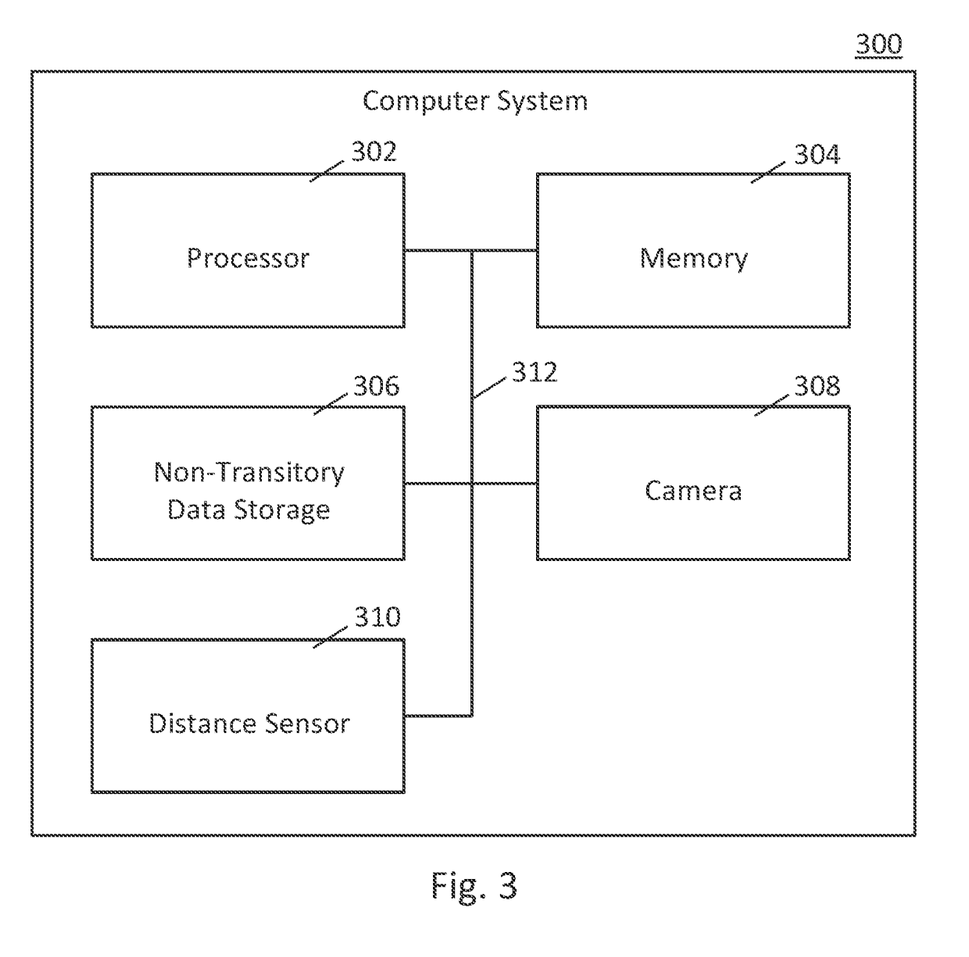
FIG. 3 a computer system with a plurality of computer hardware components configured to carry out steps of a computer-implemented method for a pitch angle recognition of a steering column in a vehicle according to various embodiments.

FIG. 3 shows a computer system 300 with a plurality of computer hardware components configured to carry out steps of a computer-implemented method for a pitch angle recognition of a steering column in a vehicle to various embodiments. The computer system 300 may include a processor 302, a memory 304, and a non-transitory data storage 306. A camera 308 and/or a distance sensor 310 (for example a radar sensor or a LIDAR sensor) may be provided as part of the computer system 300 (like illustrated in FIG. 3), or may be provided external to the computer system 300.

The processor 302 may carry out instructions provided in the memory 304. The non-transitory data storage 306 may store a computer program, including the instructions that may be transferred to the memory 304 and then executed by the processor 302. The camera 308 and/or the distance sensor 310 may be used to determine measurement data, for example measurement data that is provided to the methods described herein.

The processor 302, the memory 304, and the non-transitory data storage 306 may be coupled with each other, e.g., via an electrical connection 312, such as e.g., a cable or a computer bus or via any other suitable electrical connection to exchange electrical signals. The camera 308 and/or the distance sensor 310 may be coupled to the computer system 300, for example via an external interface, or may be provided as parts of the computer system, e.g., internal to the computer system, for example coupled via the electrical connection 312.

The terms "coupling" or "connection" are intended to include a direct "coupling" (for example via a physical link) or direct "connection" as well as an indirect "coupling" or indirect "connection" (for example via a logical link), respectively.

It will be understood that what has been described for one of the methods above may analogously hold true for the computer system 300.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

- 100 block diagram illustrating a method for a pitch angle recognition of a steering column in a vehicle
- 102 first acceleration sensor
- 104 second acceleration sensor
- 106 alignment block
- 108 transformation block
- 110 pitch angle calculation block
- 112 drift compensation block
- 114 pitch change detector
- 116 external pitch change detector
- 118 pitch quality block
- 120 pitch angle of the steering column
- N predetermined number of determinations
- M further predetermined number of determinations
- 200 flow diagram illustrating a method for a pitch angle recognition of a steering column in a vehicle according to various embodiments
- 202 step of measuring first acceleration data by means of a first acceleration sensor
- 204 step of measuring second acceleration data by means of a second acceleration sensor
- 206 step of determining drift data of at least one of the first acceleration sensor and the second acceleration sensor based on the first acceleration data and the second acceleration data
- 208 step of determining a pitch angle of the steering column based on the drift data, the first acceleration data and the second acceleration data
- 300 computer system according to various embodiments
- 302 processor
- 304 memory
- 306 non-transitory data storage
- 308 camera
- 310 distance sensor
- 312 connection

What is claimed is:

1. A computer-implemented method comprising:
measuring first acceleration data using a first acceleration sensor;
measuring second acceleration data using a second acceleration sensor;
determining drift data of at least one of the first acceleration sensor or the second acceleration sensor based on the first acceleration data and the second acceleration data; and
determining a pitch angle of a steering column based on the drift data, the first acceleration data, and the second acceleration data.

2. The computer-implemented method of claim 1, further comprising:
compensating a temperature drift of at least one of the first acceleration sensor or the second acceleration sensor based on the drift data.

3. The computer-implemented method of claim 1, further comprising:
compensating a lifetime drift of at least one of the first acceleration sensor or the second acceleration sensor based on the drift data.

4. The computer-implemented method of claim 1, further comprising:
determining a plurality of first roll angles at consecutive discrete points in time in a vehicle-coordinate system based on the first acceleration data;
determining a plurality of first pitch angles at consecutive discrete points in time in a vehicle-coordinate system based on the first acceleration data;
determining a plurality of second roll angles at consecutive discrete points in time in a vehicle-coordinate system based on the second acceleration data;
determining a plurality of second pitch angles at consecutive discrete points in time in a vehicle-coordinate system based on the second acceleration data;
determining a roll angle difference based on the plurality of first roll angles and the plurality of second roll angles; and
determining a pitch angle difference based on the plurality of first pitch angles and the plurality of second pitch angles.

5. The computer-implemented method of claim 4, wherein a compensation of a temperature drift between the first acceleration sensor and the second acceleration sensor is carried out after a first predetermined number of determinations of at least the roll angle difference.

6. The computer-implemented method of claim 5, wherein the first predetermined number of determinations is between 1 and 100.

7. The computer-implemented method of claim 4, wherein a compensation of a temperature drift between the first acceleration sensor and the second acceleration sensor is carried out after a second predetermined number of determinations of at least the pitch angle difference.

8. The computer-implemented method of claim 7, wherein the second predetermined number of determinations is between 1 and 100.

9. The computer-implemented method of claim 4, wherein a compensation of a lifetime drift between the first acceleration sensor and the second acceleration sensor is carried out after a third predetermined number of determinations of at least the roll angle difference.

10. The computer-implemented method of claim 9, wherein the third predetermined number of determinations is between 500 and 5000.

11. The computer-implemented method of claim 4, wherein a compensation of a lifetime drift between the first acceleration sensor and the second acceleration sensor is carried out after a fourth predetermined number of determinations of at least the pitch angle difference.

12. The computer-implemented method of claim 11, wherein the fourth predetermined number of determinations is between 500 and 5000.

13. The computer-implemented method of claim 1, further comprising:
detecting a change in the pitch angle of the steering column based on the determined pitch angle and a pitch angle threshold.

14. The computer-implemented method of claim 13, wherein the determination of the pitch angle of the steering column is interrupted as long as the change in the pitch angle is detected.

15. The computer-implemented method of claim 13, further comprising:
resetting the drift data after the change in the pitch angle is detected.

16. The computer-implemented method of claim 1, wherein at least one of the first acceleration data or the second acceleration data are transformed to a vehicle-coordinate system.

17. The computer-implemented method of claim 1,
wherein the first acceleration data is transformed to a camera-coordinate system, and
wherein origins of the camera-coordinate system originate in a camera mounted on the steering column.

18. The computer-implemented method of claim 17, wherein the first acceleration data of the camera-coordinate system are transformed to a vehicle-coordinate system.

19. A non-transitory computer-readable storage medium storing one or more programs, the one or more programs comprising instructions, which when executed by a processor, cause the processor to perform operations including:
 measuring first acceleration data using a first acceleration sensor;
 measuring second acceleration data using a second acceleration sensor;
 determining drift data of at least one of the first acceleration sensor or the second acceleration sensor based on the first acceleration data and the second acceleration data; and
 determining a pitch angle of a steering column based on the drift data, the first acceleration data, and the second acceleration data.

20. A vehicle comprising:
 a steering column;
 a first acceleration sensor;
 a second acceleration sensor;
 at least one processor; and
 a non-transitory computer-readable storage medium comprising instructions, which when executed by the at least one processor, cause the processor to perform operations including:
 measuring first acceleration data using the first acceleration sensor;
 measuring second acceleration data using the second acceleration sensor;
 determining drift data of at least one of the first acceleration sensor or the second acceleration sensor based on the first acceleration data and the second acceleration data; and
 determining a pitch angle of the steering column based on the drift data, the first acceleration data, and the second acceleration data.

\* \* \* \* \*